No. 763,318. PATENTED JUNE 21, 1904.
F. A. NORTH.
WATER FILTER.
APPLICATION FILED APR. 20, 1903.
NO MODEL.
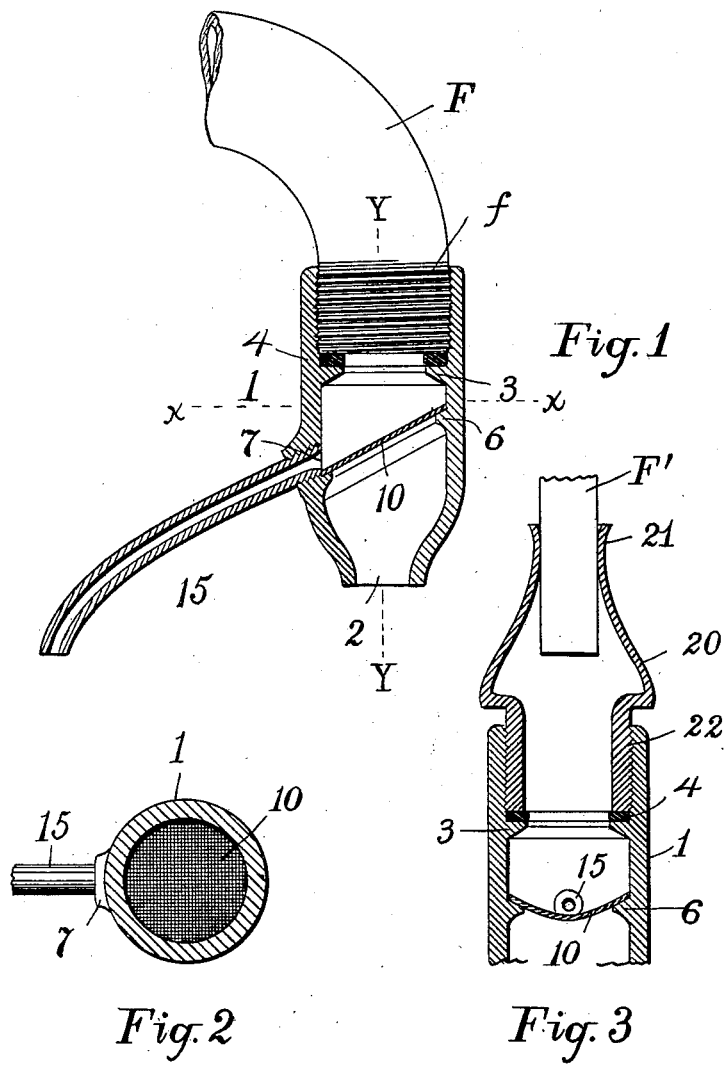
Witnesses;
Inventor,
Frank A. North;
By A. B. Upham,
His Attorney.

No. 763,318.

Patented June 21, 1904.

UNITED STATES PATENT OFFICE.

FRANK A. NORTH, OF BOSTON, MASSACHUSETTS.

WATER-FILTER.

SPECIFICATION forming part of Letters Patent No. 763,318, dated June 21, 1904.

Application filed April 20, 1903. Serial No. 153,402. (No model.)

*To all whom it may concern:*

Be it known that I, FRANK A. NORTH, a citizen of the United States, and a resident of Boston, in the county of Suffolk, State of Massachusetts, have invented certain new and useful Improvements in Water-Filters, of which the following is a full, clear, and exact description.

The object of this invention is the construction of an improved filter or strainer for attachment to faucets or other means for supplying water by which the filter-surface is kept continuously cleansed from any accumulations of the matters removed from the liquid. The means by which I accomplish this consists, essentially, in providing the filter-surface with a restricted lateral discharge for the water, so that while the great body of the water passes on through the filter and is purified thereby the restricted lateral discharge carries with it whatever matter is received upon the filter-surface, and so keeps the latter continuously cleansed.

Referring to the drawings forming part of this specification, Figure 1 is a vertical central section of my filter complete, showing the same supported by a faucet in the usual manner. Fig. 2 is a cross-section of the same on the line X X in Fig. 1; and Fig. 3 is a vertical central section of the upper part of my filter on the line Y Y in Fig. 1, showing the same provided with a means of attachment to a faucet of much smaller diameter than that in Fig. 1.

The filter-case 1 is substantially tubular in shape and provided with internal screw-threads at its upper end for engagement with the screw-threads *f* on the faucet F. Just below these screw-threads I have an internal shoulder 3, either formed integral with the case or inserted, upon which to locate a rubber or leather washer or gasket 4 for the purpose of making the connection water-tight between the faucet and filter-case. The lower end of the filter-case is contracted to form a mouth 2 to deliver the water without spattering. About midway between this mouth and the upper end of the case is located the filter or strainer 10, preferably held by being supported upon the shoulder 6, and through the case-wall on the level of the upper surface of the filter or strainer is an opening 7, preferably provided with a discharge spout or pipe 15. This spout may discharge into the sink or basin below the faucet F or F', or it may be extended to the waste-pipe of the sink or basin, as desired.

By preference the filter or strainer 10 is held in an oblique position, as shown in Fig. 1, and the discharge-pipe 15 made to lie in the same direction in order that the impact of the water upon the surface of the filter or strainer may more easily dislodge whatever is thereon and wash it off therefrom and conduct it to the pipe 15. To further aid in this direction, I prefer to give the filter a slight central depression, as shown in Fig. 3. Thus arranged the first downrush of water upon the filter-surface is made to divert a part thereof along such surface to the opening 7, carrying with it all impurities which may have descended with the water. The greater part of the water immediately passes through the strainer or filter and descends through the mouth to the receptacle to be filled; but all the time the water is flowing a limited quantity thereof is passing off through the pipe 15 and carrying with it and as soon as collected whatever impurities reach the filter.

To fit a single size of self-cleaning filter to smaller faucets, as F', I provide a rubber connection 20, having its lower end 22 constructed to fit tightly in the upper end of the filter-case and having its upper part made with a tapering extension 21, capable of stretching to fit various smaller sizes of faucets, as shown in Fig. 3.

What I claim as my invention, and for which I desire Letters Patent, is as follows, to wit:

1. The substantially tubular filter-case having the obliquely-arranged shoulder therein, in combination with the screen or filtering body supported upon said shoulder, and the small pipe-opening from said filter-case from a point just above the lowermost part of said shoulder and in line with the surface of said screen or filter body, substantially as described.

2. The combination with a filter-case, of a filter-body having its surface oblique to the flow of water through the case, and a restricted opening through the wall of the case substantially in line with said surface; said surface being depressed along a diameter in alinement with said opening, substantially as described.

In testimony that I claim the foregoing invention I have hereunto set my hand this 17th day of April, 1903.

FRANK A. NORTH.

Witnesses:
A. FARLEY BREWER,
A. B. UPHAM.